(12) United States Patent
Handke et al.

(10) Patent No.: US 8,794,265 B2
(45) Date of Patent: Aug. 5, 2014

(54) DAMPING VALVE ARRANGEMENT FOR A VIBRATION DAMPER

(75) Inventors: Günther Handke, Euerbach (DE); Klaus Lieblein, Dittelbrunn (DE); Thomas Frank, Schweinfurt (DE)

(73) Assignee: ZF Friedrichshafen AG, Friedrichshafen (DE)

(*) Notice: Subject to any disclaimer, the term of this patent is extended or adjusted under 35 U.S.C. 154(b) by 332 days.

(21) Appl. No.: 13/301,906

(22) Filed: Nov. 22, 2011

(65) Prior Publication Data

US 2012/0138837 A1 Jun. 7, 2012

(30) Foreign Application Priority Data

Dec. 2, 2010 (DE) .......................... 10 2010 062 324

(51) Int. Cl.
| | |
|---|---|
| F16K 15/14 | (2006.01) |
| F16K 17/26 | (2006.01) |
| F16K 24/00 | (2006.01) |
| F16K 15/00 | (2006.01) |
| F16K 17/00 | (2006.01) |
| F16K 21/04 | (2006.01) |
| F16F 9/50 | (2006.01) |
| F16F 9/348 | (2006.01) |
| F16F 9/56 | (2006.01) |
| F16F 9/34 | (2006.01) |
| F01L 3/10 | (2006.01) |

(52) U.S. Cl.
USPC .................. 137/854; 137/493.8; 137/512.4; 137/512.15; 188/282.5; 188/282.8; 188/322.15; 251/337

(58) Field of Classification Search
CPC ....... F16F 9/348; F16F 9/3484; F16F 9/3485; F16K 7/17; F16K 15/148

USPC ...................... 137/493.8, 512.4, 512.15, 854; 251/337; 188/282.5, 282.8, 322.15
See application file for complete search history.

(56) References Cited

U.S. PATENT DOCUMENTS

| | | | | |
|---|---|---|---|---|
| 3,336,942 | A | * 8/1967 | Keith et al. | .................... 137/529 |
| 5,413,195 | A | * 5/1995 | Murakami | ................. 188/282.6 |
| 6,276,498 | B1 | * 8/2001 | Kirchner | .................... 188/282.5 |
| 8,517,153 | B2 | * 8/2013 | Baltes | ......................... 188/282.6 |
| 2004/0021123 | A1 | * 2/2004 | Howell et al. | ................. 251/337 |

FOREIGN PATENT DOCUMENTS

| | | |
|---|---|---|
| DE | 74 676 | 1/1969 |
| DE | 2 426 326 | 12/1974 |
| DE | 25 00 826 | 7/1976 |
| DE | 31 09 960 | 9/1982 |
| DE | 44 24 434 | 8/1995 |
| DE | 100 11 168 | 9/2001 |

* cited by examiner

Primary Examiner — John Rivell
Assistant Examiner — Hailey K Do
(74) Attorney, Agent, or Firm — Cozen O'Connor

(57) ABSTRACT

A damping valve arrangement for a vibration damper includes a damping valve body, which has at least one through-flow opening for the damping medium, and at least one valve disk which at least partly covers the through-flow openings under the influence of a closing force. The damping valve arrangement includes at least one spring element which has at least one supporting portion axially supported at another structural component part of the damping valve arrangement, and at least one spring portion disposed at a distance from the supporting portion and which introduces a spring force into the valve disk at least indirectly, wherein the spring force of the spring element is directed counter to the closing force acting on the valve disk, and wherein the spring force of the spring element is less than the closing force of the valve disk.

6 Claims, 3 Drawing Sheets

DAMPING VALVE ARRANGEMENT FOR A VIBRATION DAMPER

BACKGROUND OF THE INVENTION

1. Field of the Invention

The present invention is directed to a damping valve arrangement for a vibration damper having a damping medium flowing through the damping valve arrangement, and wherein the damping valve arrangement includes a damping valve body, which has at least one through-flow opening for the damping medium, and at least one valve disk which is arranged at the damping valve body and which at least partly covers the through-flow openings in the damping valve body under the influence of a closing force.

2. Description of the Related Art

A damping valve arrangement of the type mentioned above for a vibration damper is known from U.S. Pat. No. 6,401,755.

A damping valve arrangement for a vibration damper of this type generally comprises a damping valve body, which has at least one through-flow opening for the damping medium, and at least one valve disk arranged at the damping valve body. The valve disk at least partly covers the through-flow openings in the damping valve body under the influence of a closing force.

Damping medium flows through the damping valve arrangement. The damping medium flows through the through-flow openings in the damping valve body and presses against the valve disk arranged at the damping valve body. If the damping medium pressure force exceeds the closing force of the valve disk, the valve disk is lifted from the damping valve body and allows the damping medium to flow through the valve. In so doing, a relatively abrupt pressure compensation takes place.

When the damping medium pressure decreases, the valve disk which is acted upon by the closing force immediately closes again and at least partly covers the through-flow openings in the damping valve body.

The immediate closing of the valve disk and the abrupt pressure compensation cause annoying knocking noises when the valve disk is opened.

SUMMARY OF THE INVENTION

It is thus an object of the present invention to propose a damping valve arrangement in which a reduction of knocking noise is achieved.

According to the present invention, this object is met in that the damping valve arrangement comprises at least one spring element, this spring element having at least one supporting portion which is axially supported at another structural component part of the damping valve arrangement, and at least one spring portion which is disposed at a distance from the supporting portion and which introduces a spring force into the valve disk at least indirectly, wherein the spring force is directed counter to the closing force acting on the valve disk, and wherein the spring force is less than the closing force.

The pressing force of the valve disk acting on the damping valve body can be changed by a defined magnitude by means of the spring force of the spring element acting in opposition to the closing force. The damping medium pressure acting against the spring force of the valve disk is reinforced by the spring force of the spring element. Accordingly, a partial opening of the valve disk is made possible already at a low pressure level. The pressure compensation takes place at a lower damping medium pressure, which considerably reduces any knocking noise that may occur.

As the damping medium pressure decreases, the valve disk acted upon by the closing force closes again. The spring force of the spring element opposes the closing force of the valve disk and slows down the closing process of the valve disk. This appreciably reduces the noise developing during a closing process of the valve disk.

According to a preferred embodiment, the spring element has a plurality of spring levers. In this way, the spring force can be distributed in a defined manner on the surface of the valve disk facing the spring element.

Preferably, the spring portion of the spring element is formed by bends in the spring levers. Accordingly, the spring force can be predetermined independently for each spring lever, for example, by different choices of the bend area.

By constructing the spring element with spring levers of different length as suggested in another preferred embodiment, the spring force can be distributed on the valve disk asymmetrically. This changes the opening behavior and the closing behavior of the valve disk. The valve disk no longer opens abruptly, but rather starting with the area which is acted upon by the greatest spring force by the spring element. The closing of the valve disk starts with the area which is acted upon by the smallest spring force. This opening behavior substantially reduces the knocking noises because the pressure compensation can no longer take place abruptly, but rather is initiated through the spring element in a controlled manner. The same effect can be achieved by a radially asymmetrical construction of the spring levers of the spring element as suggested in two other preferred embodiments.

According to yet another advantageous embodiment, the damping valve body and the spring element are constructed so as to be fixed with respect to rotation relative to one another radially with reference to the center axis. This prevents a radial displacement of the two elements.

In yet a further preferred embodiment, the length of the spring levers of the spring element is less than the radial distance of the contact surface of the through-flow openings from the center axis of the damping valve body. Accordingly, the spring element can be mounted in any position in circumferential direction with respect to the longitudinal axis of the damping valve body.

In vibration dampers which are often subject to extreme loads, the spring element must have a greater material thickness than in vibration dampers which are only rarely, if ever, exposed to extreme loads. In this connection, the spring force likewise increases as the material thickness increases. But since the spring force must be less than the closing force of the valve disk, the valve disks must also be constructed so as to be thicker. According to another advantageous embodiment, when the spring levers of the spring element are oriented at least partially in circumferential direction with respect to the center axis of the damping valve body, the spring levers can be constructed so as to be longer and, accordingly, the spring force of the spring element can be reduced. Therefore, standardized valve disks can be used even in vibration dampers which are often exposed to extreme loading.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention will now be described in more detail by way of example with reference to the following drawings, in which.

DETAILED DESCRIPTION OF THE PRESENTLY PREFERRED EMBODIMENTS

Figure 1:
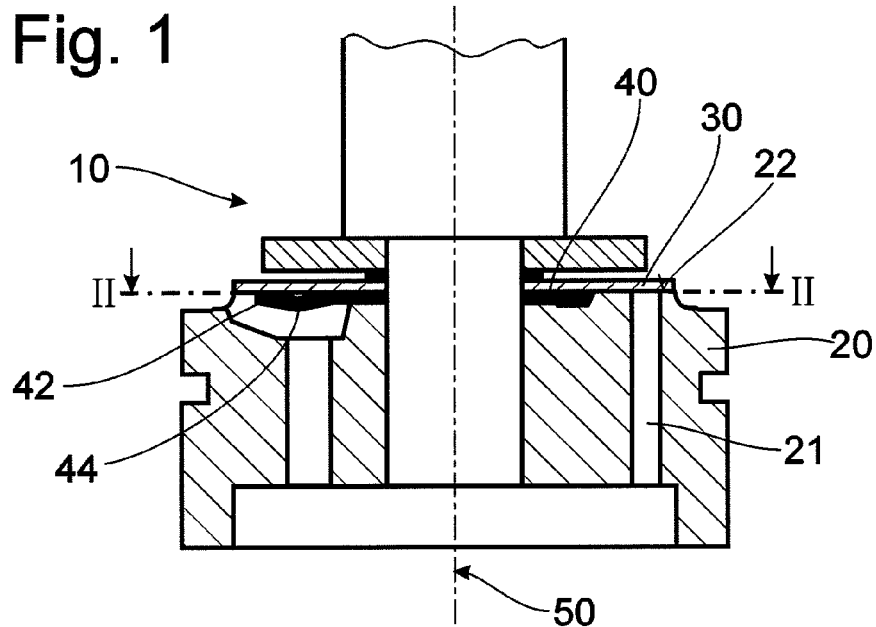
FIG. 1 is a sectional view of a damping valve arrangement according to the present invention.

The drawings show a damping valve arrangement according to the invention which is constructed as a piston valve. Another type of construction, such as a bottom valve, is not shown in the drawings but is also possible. FIGS. 1 to 5 all show a damping valve arrangement 10 according to the invention for a vibration damper; damping medium flows through the damping valve arrangement 10. The damping valve arrangement 10 shown in FIGS. 1 to 3 comprises a damping valve body 20 having a plurality of through-flow openings 21 for the damping medium. FIG. 1 shows a valve disk 30 which is pre-loaded at the damping valve body 20. The valve disk 30 at least partly covers the through-flow openings 21 in the damping valve body 20 under the influence of a closing force.

The valve disk 30 is not shown in FIGS. 2 to 5 because a clear view of the spring element 40 lying below it would be obstructed in the selected view. A spring element 40 is shown in FIGS. 1 to 5. The spring element 40 has a supporting portion 41 which is axially supported at the damping valve body 20 on one hand and at the valve disk 30 on the other hand. Further, the spring element 40 has a plurality of spring levers 43, each of which has a bend 44 and a spring portion 42 which is at a distance axially from the supporting portion 41. In the constructional variants shown in the drawings, the spring portions 42 are realized by the bends 44 in the spring levers 43. It can be seen in FIG. 1 that the spring lever 43, including spring portion 42 and bend 44, is pressed axially in direction of the damping valve body 20. The spring levers 43 are accordingly pre-loaded and spring portions 42 introduce a spring force in opposition to the closing force acting on the valve disk 30. It is clear from FIG. 1 that the spring force of the spring element 40 is less than the closing force because the valve disk 30 rests against the damping valve body 20, i.e., the valve disk 30 is closed.

Figure 2:
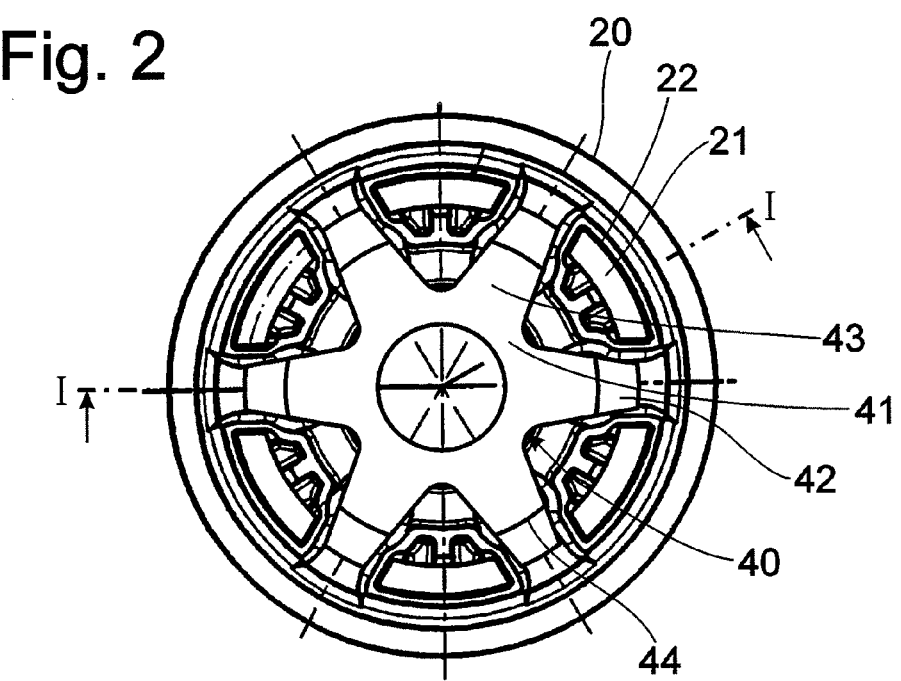
FIG. 2 is a top view of a damping valve body having a spring element according to the present invention.
Figure 3:
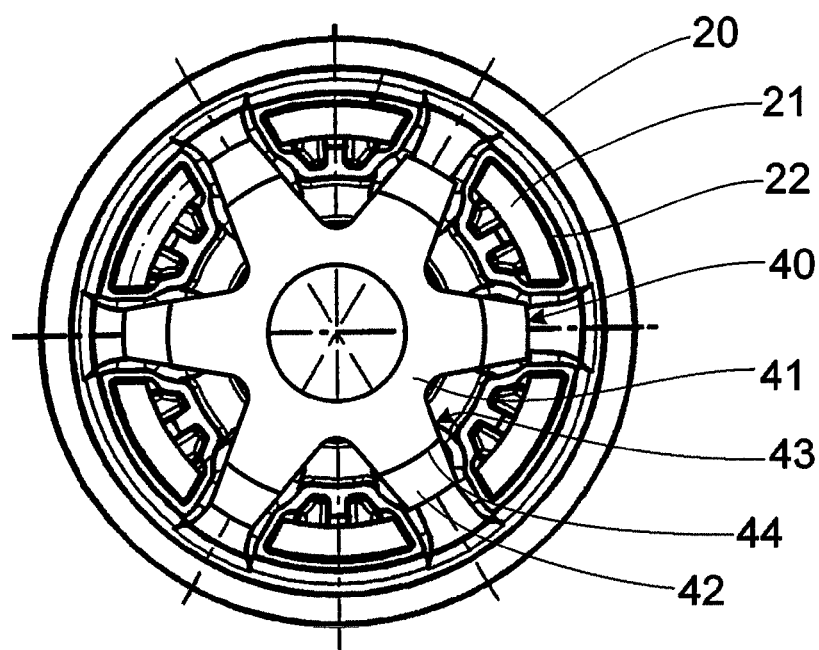
FIG. 3 is a top view of a damping valve body having another variant of a spring element according to the present invention, wherein the spring levers have different lengths.
Figure 4:
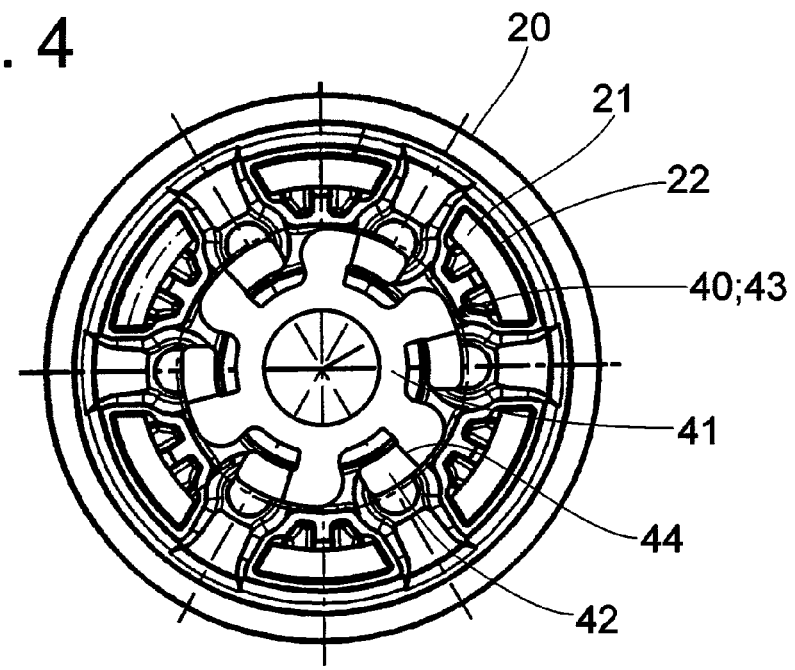
FIG. 4 is a top view of a damping valve body having another constructional variant of a spring element according to the present invention, wherein the spring levers of the spring element have a shorter length than the radial distance of the contact surface of the through-flow openings from the center axis of the damping valve body.
Figure 5:
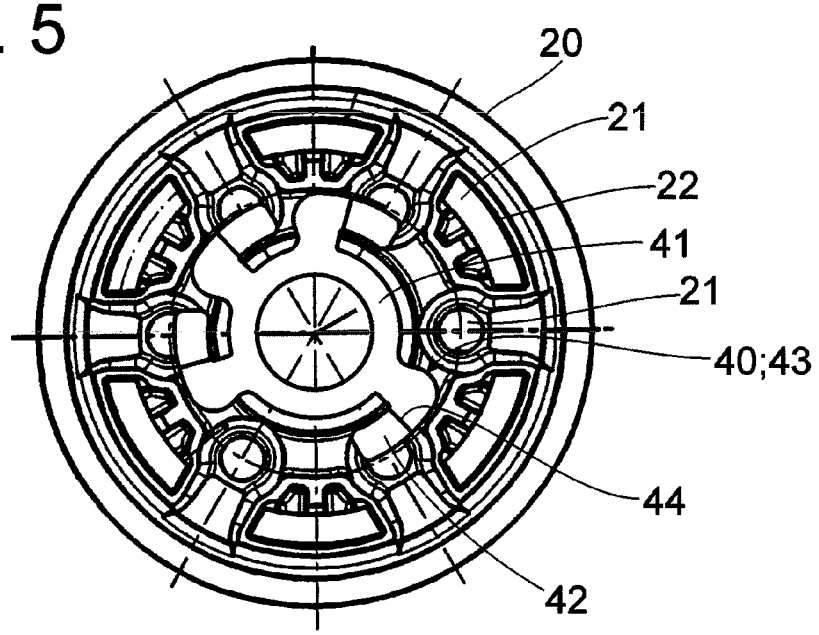
FIG. 5 is a top view of a damping valve body having another constructional variant of a spring element according to the present invention, wherein the spring levers of the spring element are constructed so as to be radially asymmetrical.

FIGS. 2 and 3 show a possible constructional variant of a damping valve arrangement 10 according to the invention. It can be seen from FIG. 1 that the contact surfaces 22 are constructed so as to be raised axially. As can be seen in FIG. 3, the spring element 40 is positioned in such a way that its spring levers 43 engage between the axially raised contact surfaces 22. Accordingly, the damping valve body 20 and the spring element 40 are constructed so as to be fixed with respect to rotation relative to one another radially with reference to the center axis 50. In the embodiment of the damping valve arrangement 10 according to the invention shown in FIG. 3, the spring levers 43 have different lengths. An asymmetrical distribution of spring force on the valve disk 30 is achieved in this way. The asymmetrical distribution of spring force is likewise achieved by the embodiment shown in FIG. 5 through an asymmetrical construction of the spring levers 43 of the spring element 40. It can be seen in FIGS. 4 and 5 that the through-flow openings 21 have a contact surface 22 for the contact of valve disk 30 and that the spring levers 43 of the spring element 40 have a length that is less than the radial distance of the contact surface 22 of the through-flow openings 21 from the center axis 50 of the damping valve body 20. FIGS. 4 and 5 also show a constructional variant in which the spring levers 43 of the spring element 40 are partially oriented in circumferential direction with reference to the center axis 50 of the damping valve body 20.

The functioning of the damping valve arrangement according to the present invention will be described in the following.

During a deflection movement, the damping medium flowing through the through-flow openings 21 in the damping valve body 20 presses against the valve disk 30. The spring levers 43 of the spring element 40 introduce a spring force into the valve disk 30. This spring force is directed against the closing force acting on the valve disk 30. The damping medium pressure acting against the closing force of the valve disk 30 is reinforced by the spring force of the spring element 40. Accordingly, a partial opening of the valve disk 30 is made possible already at a lower pressure level than in a damping valve arrangement without a spring element.

When a damping medium pressure decreases, the valve disk 30 acted upon by the closing force closes again. The spring force of the spring element 40 acts against the closing force of the valve disk 30 and slows down the closing process of the valve disk 30.

The invention is not limited by the embodiments described above which are presented as examples only but can be modified in various ways within the scope of protection defined by the appended patent claims.

We claim:

1. A damping valve arrangement (10) for a vibration damper construed to allow a damping medium to flow therethrough, said damping valve arrangement (10) comprising:

a damping valve body (20), having at least one through-flow opening (21) for said damping medium;

at least one valve disk (30) arranged at said damping valve body (20) and at least partly covering said at least one through-flow opening (21) in said damping valve body (20) under the influence of a closing force;

at least one spring element (40) having at least one supporting portion (41) axially supported at a structural component part of said damping valve arrangement (10); and at least one spring portion (42) disposed at a distance from said at least one supporting portion (41) for introducing a spring force into said valve disk (30) at least indirectly, said spring force of said spring element (40) being directed counter to the closing force acting on said valve disk (30), wherein said spring force of said spring element (40) is less than said closing force of said valve disk (30); wherein said at least one spring element (40) comprises a plurality of spring levers (43); and wherein said plurality of spring levers (43) have different lengths.

2. The damping valve arrangement (10) according to claim 1, wherein said at least one spring portion (42) of said at least one spring element (40) comprises bends (44) in said plurality of spring levers (43).

3. The damping valve arrangement (10) according to claim 1, wherein said damping valve body (20) and said at least one spring element (40) are constructed so as to be fixed with respect to rotation relative to one another radially with reference to a center axis (50).

4. The damping valve arrangement (10) according to claim 1, wherein said plurality of spring levers (43) of said at least one spring element (40) are oriented at least partially in circumferential direction with reference to a center axis (50) of said damping valve body (20).

5. The damping valve arrangement (10) according to claim 1, wherein said at least one through-flow opening (21) comprises a contact surface (22) for contact of said valve disk (30), and said plurality of spring levers (43) of said at least one spring element (40) having a length that is less than a radial distance of said contact surface (22) of said at least one through-flow opening (21) from a center axis (50) of said damping valve body (20).

6. The damping valve arrangement (10) according to claim 1, wherein said plurality of spring levers (43) of said at least one spring element (40) are constructed so as to be radially asymmetrical.

* * * * *